Patented Jan. 6, 1931

1,787,952

UNITED STATES PATENT OFFICE

GEORGE A. RICHTER AND ROGER B. HILL, OF BERLIN, NEW HAMPSHIRE, ASSIGNORS TO BROWN COMPANY, OF BERLIN, NEW HAMPSHIRE, A CORPORATION OF MAINE

MANUFACTURE OF RUBBER-IMPREGNATED FIBROUS MATERIAL

No Drawing. Application filed November 27, 1928. Serial No. 322,294.

This invention relates to the manufacture of rubber-impregnated fibrous material, being concerned with such material in the form of strands such as cord, yarn, or threads, in the form of sheet material such as paper, felt, or textile fabrics, or in the form of a pulp or suspension of fibers in water. It has now been recognized for some time that one of the most effective and economical methods of impregnating fibrous material of the character described, with rubber, is to treat such material with an aqueous rubber dispersion (either latex, or an artificial aqueous dispersion of crude or reclaimed rubber), the rubber particles being fixed to the fibrous material by drying or by coagulating the rubber with suitable agents, and then drying. By this method, one may readily incorporate a comparatively large amount of rubber into fibrous material, as an aqueous rubber dispersion may have a high rubber concentration and at the same time be free-flowing, whereas so-called "cut rubber", that is, rubber treated with solvents such as benzol, can carry only a comparatively small amount of rubber and can penetrate fibrous material but slowly, owing to the high viscosity of rubber in this condition.

We have found that it is distinctly advantageous to treat fibrous material such as described with a natural or artificial aqueous rubber dispersion, and then to treat the impregnated product with a rubber solvent to effect a swelling of the rubber particles, and finally to remove the free solvent. A product thus prepared has higher strength and stretch, absorbs much less water, and is much stronger while wet than a similar product which has not been subjected to a rubber solvent treatment. Apparently, when a rubber solvent such as benzol, carbon tetrachloride, carbon bisulphide, or a mixture of solvents including acetone or alcohol, is allowed to penetrate fibrous material which has been impregnated or treated with rubber as described, the rubber swells and closes pores or openings which permit access of moisture to the fibers, and tends to coalesce. When the free solvent is removed and the rubber restored more or less to its original condition, it is believed that substantially continuous films or membranes of rubber are left to protect or cover substantially all the fiber surface, and the fibers are accordingly bonded together more intimately. Whether or not this picture is the correct one, it is a fact that the product has been notably improved in its characteristics, particularly in its resistance to the action of moisture and its increase in wet strength.

While the process of the present invention may be applied to advantage when impregnating fibrous materials of various types with aqueous rubber dispersions, it has especial utility when bibulous webs of interfelted cellulose fibers, such as those composed of wood pulp, are being impregnated with such dispersions to produce a product intended for use as a leather substitute. In preparing foundations of this character, we have found it preferable to use an absorbent fiber, e. g., a wood pulp of high alpha cellulose content, as a raw material, and to felt such fiber on machinery of the papermaking type into a fluffy or substantially uncompacted web of high absorptivity. As described in application Serial No. 175,946, filed March 16, 1927, by George A. Richter, when a web so prepared is treated with latex or artificially dispersed rubber, as by passing the web through a bath of the rubber dispersion, a complete penetration and uniform distribution of rubber particles throughout the web takes place, and when the impregnated web is dried to coagulate the rubber, a final product having leather-like characteristics is obtained. Such a product, however, may not have the strength or elongation of a high grade leather, and its water absorption may be so high as to decrease its wet strength far below that of leather which has been permitted to absorb the same amount of water. Evidently, the cellulose fibers are imperfectly bonded together and encased in rubber, and there is a wetting of the cellulose fiber itself and a weakening of the foundation when the rubber-impregnated web is allowed to remain in contact with water. For instance, a rubber-impregnated web such as described may show a loss of as high as 75% of its dry strength after it has been allowed to soak in water for some time, the web regaining its strength only after it has been dried to its original condition.

In accordance with the process of the present invention, a rubber-impregnated web of the character described is treated with a rubber solvent or mixture of solvents to swell the rubber particles, the free solvent then being removed from the web. The treatment may be effected as by passing the rubber-impregnated web through a bath of solvent or through an atmosphere of the vapors of the solvent. For instance, a fluffy web composed of interfelted fibers may be passed through a bath of latex and the sheet dried to coagulate the latex on the fibers and bond them together. The dry web may then be passed through a bath of rubber solvent, such as benzol, whereupon an immediate swelling of the rubber takes place and the web puffs out within a second or two to a thickness of about two to four times that of the original dry web. Practically no rubber is removed from the sheet by the bath of solvent in the short interval of time necessary to effect the desired swelling of the rubber. The free solvent may be removed from the web as by passing it over hot rolls or through a hot chamber, the web shrinking practically to its original thickness. The dry product has greater strength and stretch, absorbs much less water, and is much stronger while wet than before the solvent treatment. In some cases, before subjecting the sheet to a drying action, it is pressed as between squeeze rolls or felts, to accelerate or ensure the coalescence of the rubber particles.

The procedure hereinbefore described may be carried out so as to impart other desirable characteristics to the finished product. For instance, vulcanizing agents, such as sulphur chloride or sulphur may be dissolved in the solvent bath together with suitable stabilizers or vulcanization accelerators so that when the rubber-impregnated web is passed through the bath, the rubber will absorb such agents along with the solvent. When the web is then heated to remove the solvent, the rubber will become vulcanized. It is thus seen that no additional steps need be taken to produce a vulcanized product. If desired, the aqueous rubber dispersion employed to effect impregnation may contain ingredients such as fillers, pigments, oils, waxes, gums, resins, and the like, but it is undesirable that it should contain sulphur or vulcanizing agents, since it is desirable to maintain the rubber in the sheet in an unvulcanized condition so that its swelling may be rapidly effected by rubber solvents.

While the example hereinbefore given deals with the sheeting of pulp, followed by the impregnation of the web with rubber, the process of the present invention may find useful application in a process wherein the rubber is coagulated from dispersed condition on the fibers before they are sheeted. That is to say, the aqueous rubber dispersion may be incorporated into fibrous pulp in the beater engine, and the rubber fixed on the fibers by the addition of suitable coagulants, before sheeting. The resulting rubber-impregnated web may then be subjected to treatment with a rubber solvent as hereinbefore described, where impregnation with dispersed rubber is effected after sheeting of the pulp.

In actual practice, a process such as hereinbefore described may be carried out continuously, beginning with pulp as a raw material and finishing with a web having leather-like characteristics. In other words, the pulp may be sheeted on machinery of the paper-making type and subjected to the steps or treatments hereinbefore described while coming off the paper machine in continuous web form. The finished web may be united face to face with a similar web, using rubber latex or rubber cement as the binder, and may be lacquered, embossed, or otherwise surface-finished. The solvent treatment to which the rubber-impregnated fibrous material is subjected, as already stated, swells the rubber, and when the solvent is removed doubtless results in a better encasement of the fibers in rubber and a more intimate bond between the fibers and the rubber particles. In speaking of the removal of the solvent, we do not mean a theoretical or substantially complete removal of the solvent, as there is undoubtedly residual solvent in the web, but we mean the removal of free solvent, that is, solvent which may be freed or vaporized from the web, in practical operation.

In some instances we may use a single or a mixture of water-immiscible solvents, or a mixture of such a solvent with one or more water-immiscible solvents such as alcohol.

Having thus described certain embodiments of this invention, it should be evident to those skilled in the art that various changes and modifications might be made therein without departing from the spirit or scope of invention as defined by the appended claims.

What we claim is:

1. A process which comprises impregnating fibrous material with an aqueous rubber dispersion, impregnating the rubber-impregnated product with a rubber solvent to effect a swelling of the rubber, and removing the solvent.

2. A process which comprises impregnating fibrous material with an aqueous rubber dispersion, coagulating the rubber in the fibrous material, impregnating the product with a rubber solvent to effect a swelling of the rubber, and removing the solvent.

3. A process which comprises impregnating fibrous material with an aqueous rubber dispersion, drying, impregnating the dry product with a rubber solvent to effect a swelling of the rubber, and removing the solvent.

4. Steps which comprise impregnating a web containing rubber coagulated from a rubber dispersion with a rubber solvent to effect a swelling of the rubber, and removing the solvent.

5. Steps which comprise impregnating a web of felted cellulose fibers with an aqueous rubber dispersion, drying, impregnating with a solvent to effect a swelling of the rubber, and removing the solvent.

6. A process which comprises felting cellulose fibers into a fluffy web, impregnating with an aqueous rubber dispersion, drying, impregnating with a solvent to effect a swelling of the rubber, and removing the solvent.

7. A process which comprises impregnating fibrous material with an aqueous rubber dispersion, drying, impregnating the dry product with a rubber solvent containing a vulcanizing agent, and removing the solvent.

8. A process which comprises impregnating fibrous material with an aqueous rubber dispersion, drying, impregnating with a rubber solvent containing a vulcanizing agent and an accelerator of vulcanization, and evaporating the solvent.

9. A process which comprises impregnating fibrous material with an aqueous rubber dispersion, drying, impregnating the dry product with a rubber solvent containing a vulcanizing agent, and removing the solvent at elevated temperature to effect vulcanization 10. A process which comprises felting cellulose fiber into a web, passing the web through an aqueous rubber dispersion, drying, passing the dry product through a bath of rubber solvent, and removing the solvent.

11. A process which comprises impregnating a web of felted cellulose fibers with an aqueous rubber dispersion, drying, impregnating with a rubber solvent to effect a swelling of the rubber, pressing, and removing the solvent.

12. A product comprising dried, rubber-dispersion-impregnated fibrous material, the rubber content of which has been treated with a rubber solvent.

13. A product comprising a dried, latex-impregnated web of interfelted cellulose fiber, the rubber content of which has been treated with a rubber solvent.

In testimony whereof we have affixed our signatures.

GEORGE A. RICHTER.
ROGER B. HILL.